United States Patent [19]

Herzog et al.

[11] Patent Number: 4,704,787
[45] Date of Patent: Nov. 10, 1987

[54] PROCESS FOR PRODUCTION OF THE WINDING OF AN ELECTRICAL MACHINE

[75] Inventors: Kurt Herzog, Schlieren; Roland Schuler, Wettingen, both of Switzerland

[73] Assignee: BBC Brown, Boveri & Company, Limited, Baden, Switzerland

[21] Appl. No.: 921,264

[22] Filed: Oct. 21, 1986

[30] Foreign Application Priority Data

Nov. 25, 1985 [CH] Switzerland .................... 5028/85

[51] Int. Cl.⁴ .................................... H02K 15/14
[52] U.S. Cl. ................................ 29/596; 29/598
[58] Field of Search ............................ 29/596, 598

[56] References Cited
U.S. PATENT DOCUMENTS
2,561,982  7/1951  Hanna et al. .

FOREIGN PATENT DOCUMENTS
464331  12/1968  Switzerland .

OTHER PUBLICATIONS
"Micadur–Compact Kunstharz–Isolierung für mittlere Hochspannungsmaschinen" by BBC Aktiengesellschaft Brown, Boveri Cie.

Primary Examiner—Timothy V. Eley
Attorney, Agent, or Firm—Oblon, Fisher, Spivak, McClelland & Maier

[57] ABSTRACT

With stator windings impregnated by total immersion, the gap formation between main insulation (7) and slot side possibly occurring due to the different expansion of conductor material and insulation material is avoided by several successive impregnation and curing processes being made (at least two), each further curing being performed at a lower temperature level (difference about 20° C.) beginning at approximately the class temperature of the insulation system and the curing being performed with horizontal stator axis, the stator being turned through at least 90° C. before each further process.

6 Claims, 1 Drawing Figure

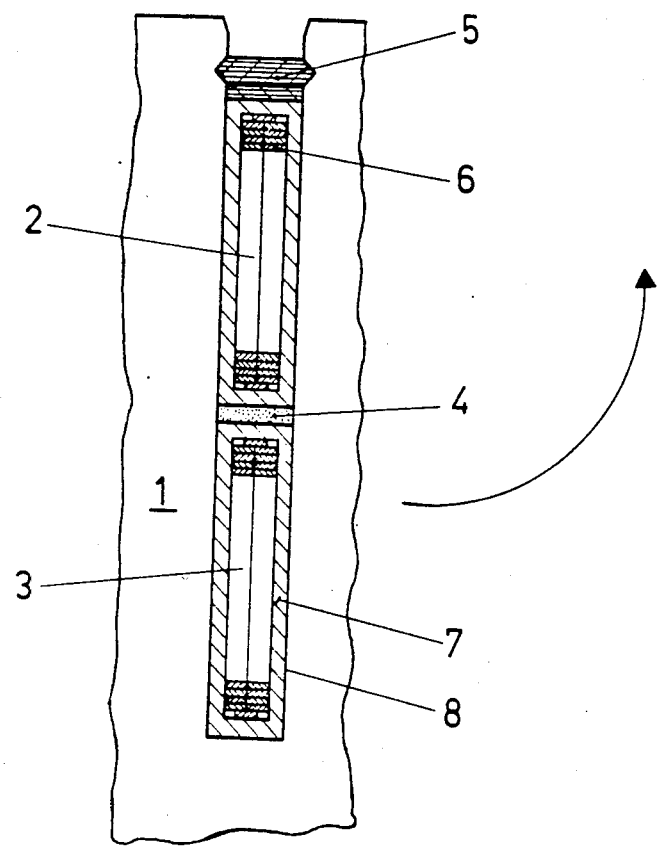

PROCESS FOR PRODUCTION OF THE WINDING OF AN ELECTRICAL MACHINE

The invention relates to a process for production of the winding of an electrical machine in the total-immersion impregnation process according to the preamble of patent claim 1.

Production processes are known for example from the book published by H. Sequenz "Herstellung der Wicklungen elektrischer Maschinen" (Production of the windings of electrical machines", Springer Verlag Vienna-New York 1973 p. 153, from the publication "Micadur-Compact Kunstharz-Isolierung für mittlere Hochspannungsmaschinen" (Micadur-Compact synthetic resin insulation for medium high-voltage machines) by BBC Aktiengesellschaft Brown, Boveri Cie., Baden (Switzerland)—No. 3889, or else from German Patent Specification No. 2,538,702.

In such processes, the coils or rods, built up from several insulated wires (windings) are brought into the correct shape, bonded in their slot portion and wound with a combined integrated-mica glass-silk tape several times around the main insulation, proceeding continuously along the entire length. Thanks to the use of the same tape for the entire coil length, an even coil insulation is produced. The finished coils are laid unimpregnated (dry), and if necessary provided with a corona shielding cover, into the iron laminations, then interconnected and the slots are sealed with wedges.

The end-winding support is made with an endless, absorbent glass-fiber bandage. By drying, the remaining moisture is drained from the winding and then the iron laminations with the winding are placed in an impregnating vessel and impregnated with an epoxy resin by a vacuum process. A subsequent pressure treatment facilitates the penetration of the resin into all insulation parts and support elements. There then follows a curing period at elevated temperature.

The windings produced by the process described above are characterized in particular by the following properties: High mechanical strength, uniform electric strength and good dielectric properties, high thermal loadability, sensitivity to moisture, oil, other contaminants, effect of radioactive radiation and high operational reliability.

It has now been shown that the dielectric and mechanical properties of the winding insulation can be further improved considerably, which is of decisive significance with regard to the long-time behavior of the winding insulation in particular in the transition to higher machine voltages (about 6 kV and above) and greater machine lengths (about 1 m and above): For reasons of process engineering, in the total-immersion impregnation process, the insulation is cured virtually without additional compression. Although the cavities in the stator slots between main insulation, intermediate layers and slot side, caused by the structure of the windings built up from insulated conductor element bundles, intermediate layers and slot seal wedges, are filled out with impregnating agent during the impregnation process, generally unavoidable, even if comparitively small, cavities are formed during curing owing to partial flowing out and curing shrinkage of the impregnating agent. These cavities are partially also due to the different thermal expansions, in particular of the copper conductor. This can result, for example, in a fine clearance being formed between neighbouring slot side and insulated conductor surface. Similar effects may also occur in the first operating period as the result of thermal loading.

To avoid the shortcomings mentioned, it has already been proposed to fill out all installation clearances necessary for installation by suitable measures.

On machines with higher machine output, the inducing magnetic forces acting in the conductors increase so that the conductors can vibrate at doubled system frequency if there are gaps. The consequence is a mechanical destruction of the main insulation, which may ultimately lead to failure of the machine.

According to the invention, the disadvantageous gap formation is avoided by at least two complete impregnation and curing processes being carried out successively, each further curing being performed at a lower temperature level, preferably about 20° C. lower, beginning approximately at class temperature of the insulation system, and the curing being performed with horizontal stator axis, and by the stator being turned through at least 90°, but not more than through 180°, before each further process.

In the production of rotor windings for electrical machines, it is proposed in U.S. Pat. No. 2,648,018 to carry out the curing of the rotor flooded with impregnating resin initially for two hours at 60° C., for two further hours at 80° C. and finally for eight hours at 100° C., in other words to increase the temperature level successively, in contrast to the subject-matter of the invention.

However, this does not permit the gap formation to be avoided.

The invention is explained in more detail below in an example with reference to a stator winding consisting of Roebel bars.

In the one and only drawing, a cross-section through a winding rod and the laminated stator core adjacent to it are illustrated in section and simplified. In the slot in the laminated stator core 1 lie two stator winding rods 2 and 3, one above the other. Arranged between the two rods is an intermediate layer 4 of insulating material, for example glass-fiber reinforced plastic. A slot wedge 5 of the same material seals the slot and serves to fix the rods 2 and 3 in the slot. The rods are constructed in the conventional way. They consist of conductor elements 6 with a conductor element insulation (not shown) which is twisted in a known way by the Roebel principle. Each rod 2, 3 is surrounded by a main insulation 7, which is provided at its outer surface 8 with a corona shielding cover (not shown) permeable to impregnating resin.

According to the known total-immersion impregnation process (for example in accordance with the company publication mentioned at the start "Micadur-Compact . . . ", the rods are laid ready-insulated in the dry state into the stators slots, wedged and subjected to a first impregnation and curing process. In addition the entire laminated stator core with wedged winding is flooded with impregnating resin at room temperature in an impregnating vessel, after previous evacuation, and subsequently heated up in a hardening stove to a first temperature, whereby the impregnating resin is completely cured. This initial temperature depends on the class temperature of the insulation system (thermal resistance class), and is, for example, about 180° C. for Class H, about 155° C. for Class F.

Thereafter, the stator core is allowed to cool approximately to room temperature. The stator core is turned through 90° about its longitudinal axis and again flooded with impregnating resin and thereby impregnated and subsequently cured outside the resin bath for a second time at a temperature about 20° lower.

In the event that gaps have formed in the insulation system due to the cooling process, principally between main insulation and groove side, they are then filled out with resin.

When re-cooling to room temperature, the tendency to form gaps is drastically less because the process sets out from a lower temperature level and a shrinkage of the insulation can no longer occur.

If need be, this second impregnation and curing process can be followed by a third or even fourth process, accompanied in each case by a stator turning through 90° in each case.

Even though additional process steps are necessary in the process according to the invention compared with the conventional total-immersion impregnation process, this is more than balanced out by the resultant advantages (more homogeneous structure, no gap formation and therefore no vibrations or spark discharges, which permits the total-immersion impregnation process to be used in the first place up to the highest nominal voltages and specific outputs > 100 MVA, as well as very good heat transfer between conductors and iron laminations).

The invention was explained above with reference to a stator winding consisting of Roebel rods. However, the process can be applied without any modifications to other stator winding types and, of course, also to rotor windings.

We claim:

1. A process for producing a winding in a core in an electrical machine, said winding containing conductor rods having several mutually insulated conductor elements, each rod being surrounded by insulation, which process comprises:
   (a) impregnating the conductor rods in the entirety with impregnating resin,
   (b) heating the resin at a temperature sufficient to effect substantially complete curing of the same,
   (c) cooling the core or allowing the core to cool to ambient temperature,
   (d) turning the core through at least 90°, longitudinally, and flooding the same with impregnating resin, and
   (e) heating the resin, to effect curing, at a temperature of at least about 20° C. lower than the temperature of the first heating step.

2. The process as claimed in claim 1, wherein said core is a rotor or stator core.

3. The process as claimed in claim 1, which further comprises a third and fourth impregnation step, each additional impregnation being preceded by turning the core through at least 90°, and then being followed by heating the resin at a temperature sufficient to effect substantially complete curing of the same, and then cooling the core or allowing the core to cool to ambient temperature.

4. The process as claimed in claim 1, wherein after heating said impregnated resin to effect curing of the same, and then cooling the core or allowing the same to cool to ambient temperature, said core is turned through at least 90°, but not more than 180° C., prior to a subsequent impregnation.

5. The process as claimed in claim 1, which further comprises, after step (e), cooling the core or allowing the core to cool to ambient temperature.

6. The process as claimed in claim 1, wherein said winding in said core is a stator winding, and said conductor rods are Roebel rods.

* * * * *